April 16, 1929.                M. ORGÉ                  1,709,094
                         AGRICULTURAL MACHINE
                         Filed Dec. 23, 1926            7 Sheets-Sheet 5

Fig. 6.

Inventor
Marcel Orgé
By
Attorney

April 16, 1929.  M. ORGÉ  1,709,094
AGRICULTURAL MACHINE
Filed Dec. 23, 1926   7 Sheets-Sheet 7

Inventor
Marcel Orgé
By
Attorney

Patented Apr. 16, 1929.

1,709,094

UNITED STATES PATENT OFFICE.

MARCEL ORGÉ, OF LA PLAINE ST. DENIS, FRANCE.

AGRICULTURAL MACHINE.

Application filed December 23, 1926, Serial No. 156,670, and in Belgium December 24, 1925.

The present invention relates to agricultural machines and, more particularly, to those of the types used for gathering hay which has already been cut.

One of the objects of the invention is to provide a machine capable of not only gathering and elevating the hay, but of depositing it in successive stacks or bundles as the machine moves across a field.

Another object is to provide a rotatable and tiltable platform on the rear end of the machine upon which the hay is formed into stacks, and which, on being tilted, deposits the formed stack upon the ground.

A further object is to provide a rotatable, tiltable platform of such construction that, when tilted the hay stack is capable of contacting with the ground before it is discharged from platform.

A still further object is to provide a belt conveyor in connection with the rotatable stacking and discharging platform, said conveyor serving to discharge the formed stacks when the platform is tilted into its inclined position.

Still another object is to provide a machine so arranged that a single belt conveyor is capable of elevating the hay gathered by all the gathering devices attached to the machine.

An additional object is to provide mechanisms functioning entirely automatically and capable of forming the hay into stacks and depositing the same upon the ground.

Still another object is to provide a stack-forming platform capable of being actuated at a speed varying automatically with the height of the stack or bundle being formed, thus automatically controlling the amount of hay deposited at any given point and at any given level, and forming stacks or bundles of constant and regular form whose transverse section decreases as the stack or bundle is in course of formation.

A further object is to provide a special mounting for the teeth of the gathering rakes arranged so that each tooth is capable of swinging on a pivot against the action of a spring in a direction opposite to the movement of the machine.

Further and additional objects will appear in the course of the detailed description which will now be given in connection with the accompanying drawings in which:—

Figure 1:
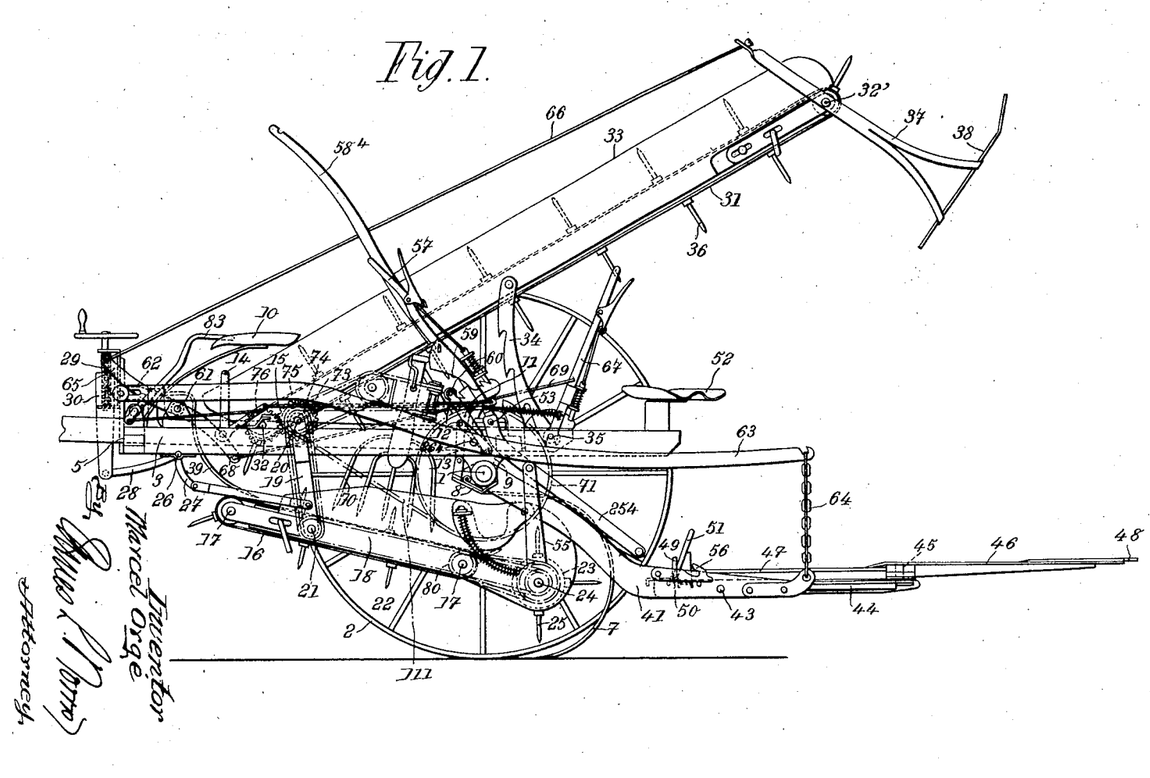
Fig. 1 is a side view of one embodiment of the invention, one wheel of the machine being removed.
Figure 2:
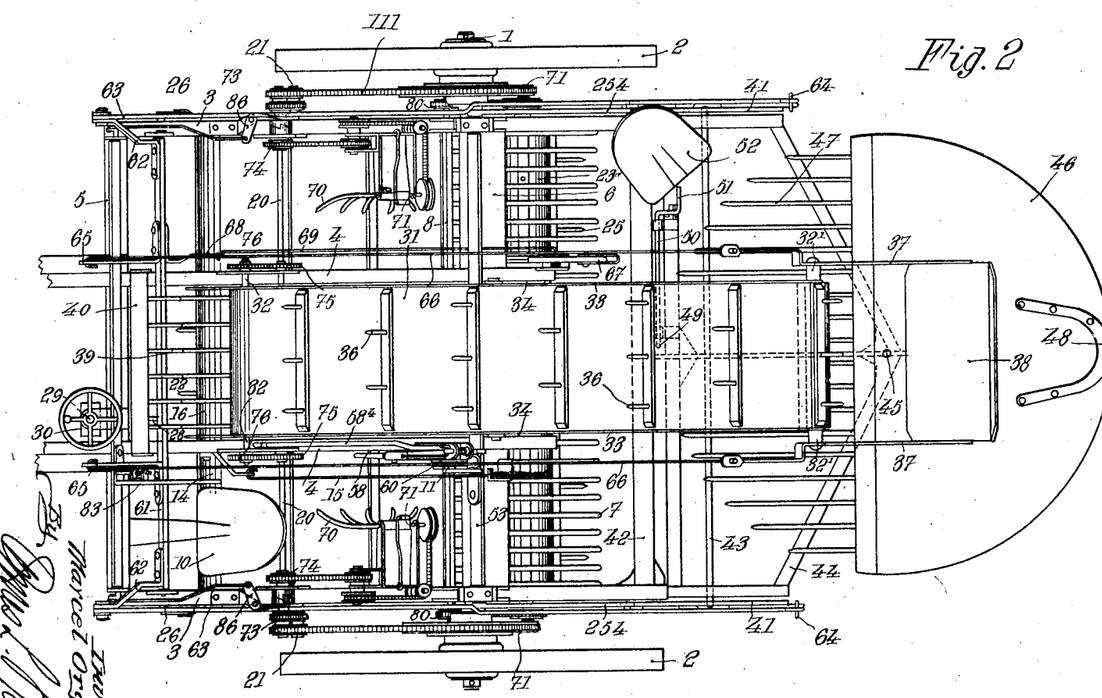
Fig. 2 is a plan view of the machine illustrated in Fig. 1.

Referring to the various figures of the drawing, there is shown a machine capable of being drawn by a horse or a tractor, and comprising a chassis mounted on an axle 1, which is in turn mounted on a pair of wheels 2 of the ground-gripping type such as those used on moving machines. The chassis, is preferably mounted above the axle, and comprises a pair of exterior, longitudinal members or longérons 3, a pair of internal, longitudinal members 4 adapted to carry the shafts by means of which the machine will be drawn by a horse or tractor, and transverse frame members or cross-bars 5 and 6 located respectively slightly forward of, and posterior to, axle 1. A rake 7 is interposed between longérons 3, each tooth of said rake being articulated on transverse bar 8. Bar 8 may be adjustable in any desired position by means of a properly arranged stopping member and is capable of being rotated about axle 1 when it is desired to elevate or lower the teeth of the rake. The manner in which bar 8 is mounted may be such as is shown in Figs. 1 and 2, wherein it is shown articulated directly on axle 1 in a position slightly in advance of, and at a somewhat lower level than the latter. Alternatively it may be mounted as represented in Figs. 3 to 7. Here bar 8 forms the lower side of a frame 8—90—91 freely supported on axle 1. Each tooth 7 is connected to the bar through the intermediary of a pivot $93^1$ (Fig. 5) which fits loosely into a notch or recess $93^2$ formed in arm 94 which fits loosely over bar 8. Arm 94 is actuated toward a fixed stop $94^1$ attached to bar 8 by means of a spring 95 fastened to the stop. Whenever a rake tooth 7 comes into contact with an obstacle it tilts backward about bar 8 as an axis against the action of spring 95 and resumes its normal position under the continued action of the spring, as soon as the obstacle has been passed. Bar 8 may be lowered and raised by means of the mechanisms shown in Figs. 1 and 2 or by means of those represented in Figs. 3 to 8. In the form shown in Figs. 1 and 2, a transverse shaft 9 is journalled on transverse member 6 and carries an arm or finger 11 mounted at right angles on its left-hand extremity and near the driver's seat 10. Finger or arm 11 is inclined forwardly against left longéron 4. Shaft 9 carries a second arm or finger 12, also mounted at right angles thereto on its opposite extremity. A connecting rod 13 connects arm 12 to bar 8. From the foregoing, it is evident that, on pressing against a foot pedal 14 or similar convenient control (the control or pedal working against a spring) pivoted on left longéron 4 and connected to arm 11 by a rod 15, the position of bar 8 and therefore of the entire rake may be adjusted relatively to the ground as desired. In the bar adjusting mechanism shown in Figs. 3 to 8, a hand lever 57 is mounted on one longéron 4 near the driver's seat 10, and is connected through the intermediary of articulated rods 96 and 97 to frame 8—90—91. Lever 57 carries a latch 98 capable of engaging teeth on a cam 99 which is also supported on longéron 4. By manipulating lever 57, latch 98 may be shifted to engage the various teeth of the cam and to hold frame 8—90—91 in elevated or lowered position.

In the several figures of the drawing, various means are shown for elevating the hay after it has been gathered by the rakes. In the modification represented in Figs. 1 and 2, an intermediate conveying system is shown interposed between the rake and the elevating conveyor. This intermediate system comprises an endless belt running over pulleys mounted on shafts 17 journalled on a longitudinal frame which is supported on two longitudinal supports 18. Supports 18 are suspended forwardly by a pair of connecting rods 19 (their rear suspension will be indicated later) each articulated (1) with transverse shaft 20 journalled on longérons 3 and (2) with transverse shaft 21 attached to the external faces of supporting members 18. This form of construction permits the belt to assume an inclined position with its forward extremity at a convenient distance behind transverse frame member 5 and with its posterior extremity substantially in vertical alignment with bar 8 of the rake. Belt 16 carries, on its external surface, transverse strips having a number of stacks or teeth 22 fixed therein and adapted to prevent the hay from sliding on the belt. The intermediate conveying system comprises, further, a transverse cylinder 23 mounted on shaft 24 which is journalled on the prolonged extremities of members 18. Cylinder 23 rotates in the space embraced by the rake teeth and is provided with radial teeth 25 arranged in regularly staggered series around the cylinder. Belt 16 and cylinder 23 are, thus, supported as a unit on supporting members 18. A deflecting rake 39 is supported on transverse member 60 which is fixed on longérons 4 slightly forward of chassis frame member 5. Rake 39 faces rearwardly and guides the hay from belt 16 to elevating belt 31. Means are provided for adjusting the distance between cylinder 23 and rake teeth 7, comprising a transverse shaft shaft 26 arranged beneath the forward end of longérons 3, said shaft having cranked or bent extremities 27 which articulate with members 18 or their prolongments, and an arm 28, connected at one end to shaft 26 and articulating, at its other extremity, with a screw adjustment comprising a movable female element 30 and a screw 29 rigidly supported on the chassis. By turning screw 29, arm 28 rocks shaft 26 and through the intermediary of elements 27 and supporting members 18, moves cylinder 23 toward or away from rake 7.

Figures 3, 5:
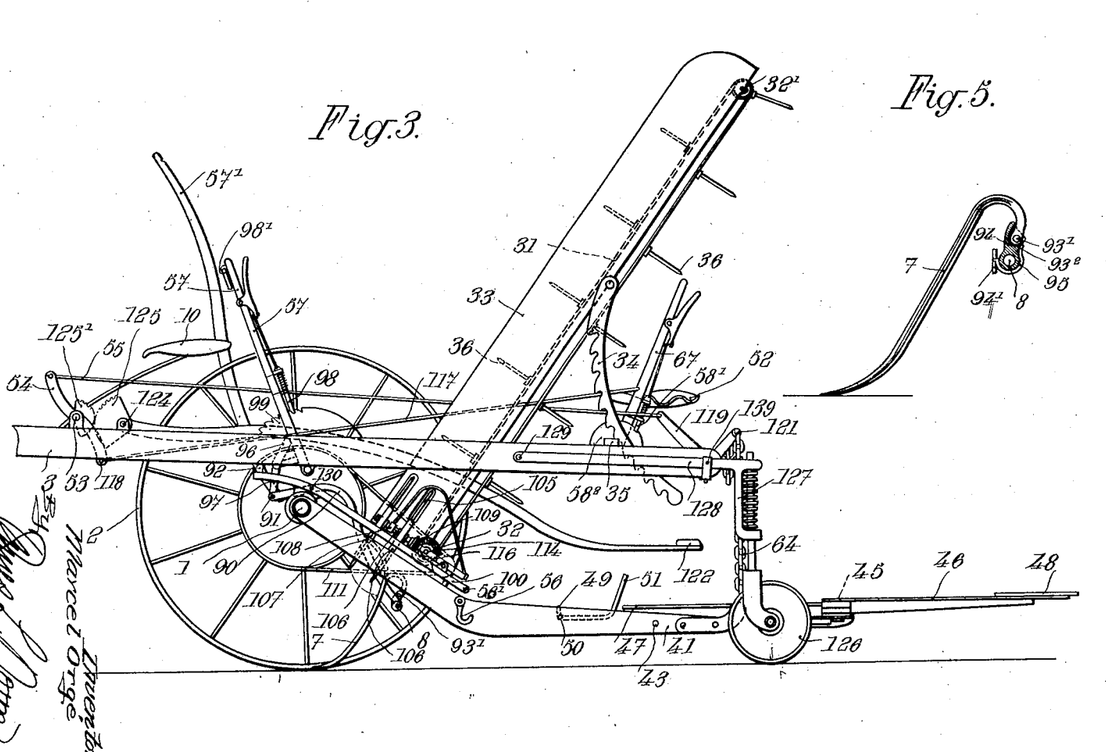
Fig. 3 is a section through a second embodiment of the invention taken on line 3—3, Fig. 4.
Fig. 5 is a detailed section of the rake-tooth mounting shown in Figs. 3 and 4.
Figure 4:
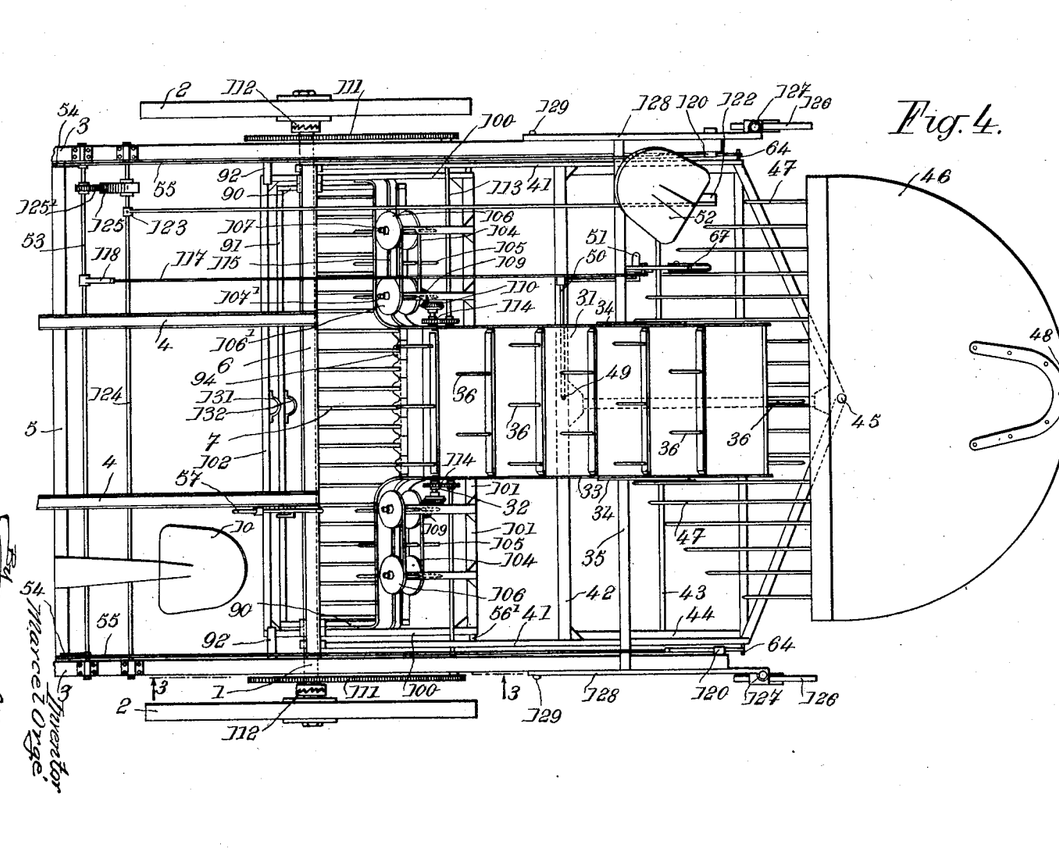
Fig. 4 is a plan of the machine represented in Fig. 3.
Figure 6:
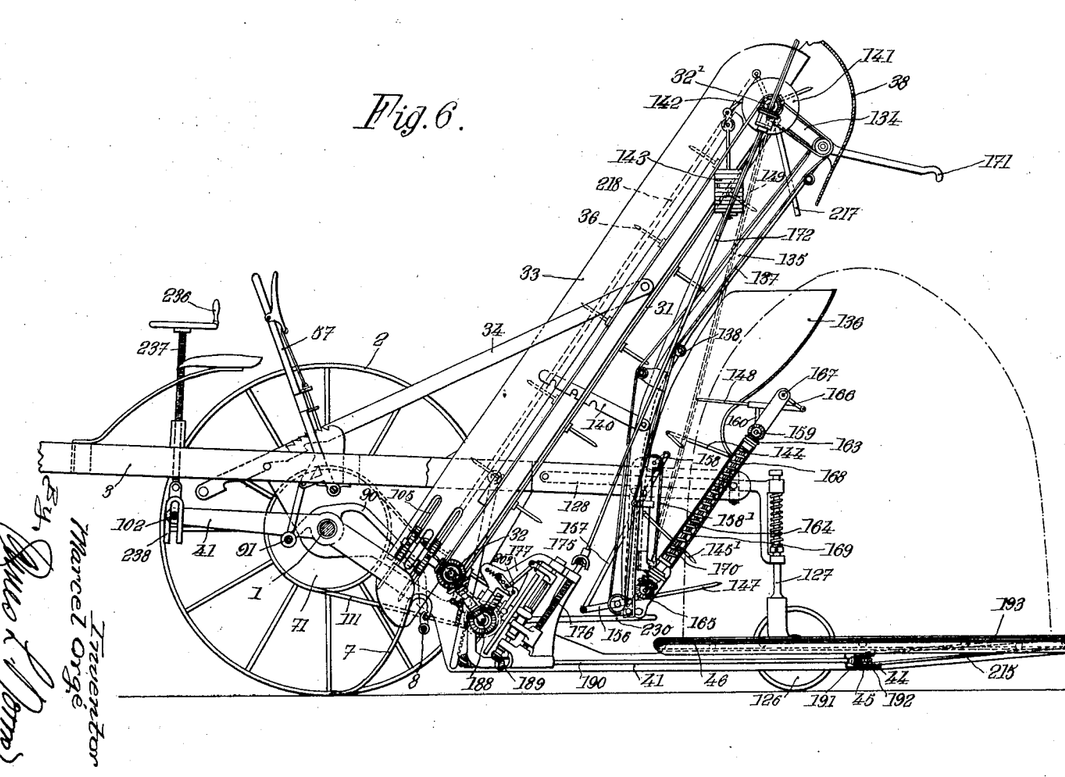
Fig. 6 is a partial section of a third form of the invention taken on line 6—6, Fig. 7.
Figure 7:
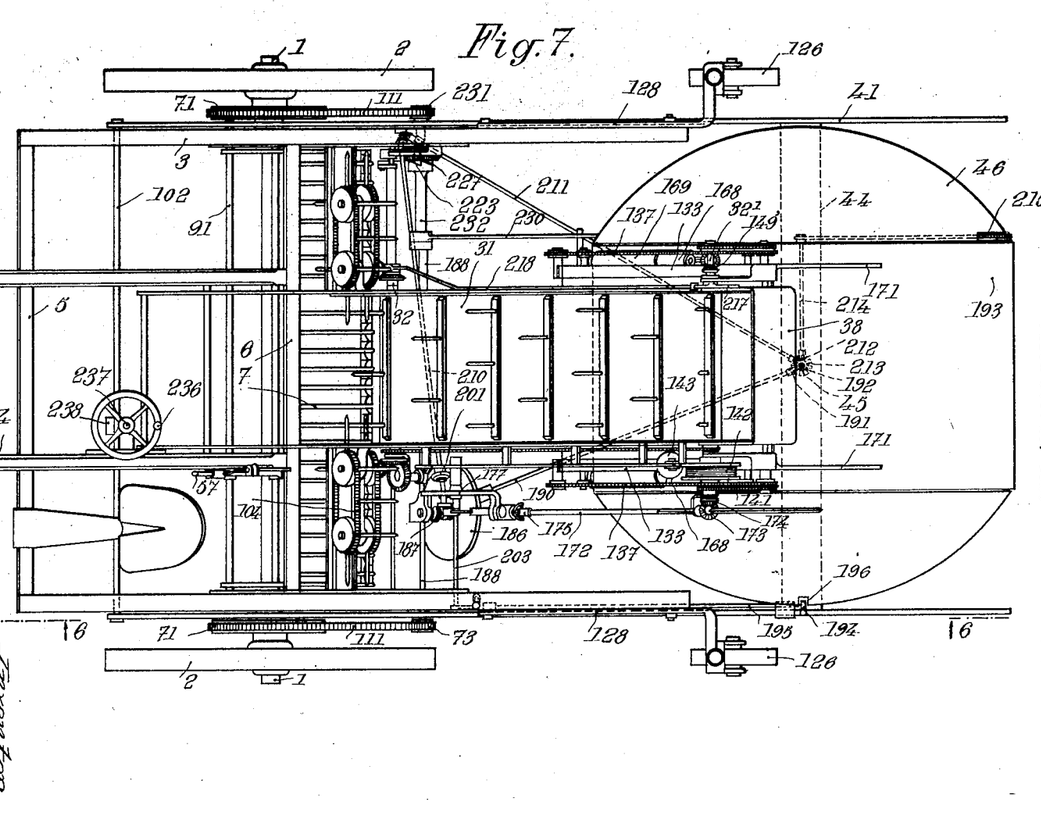
Fig. 7 is a plan of the modification shown in Fig. 6.
Figure 8:
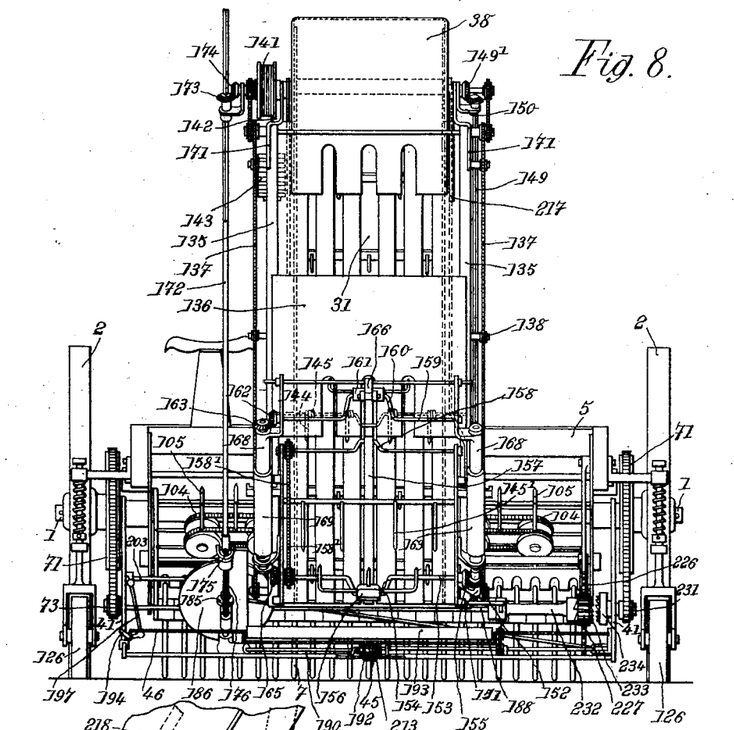
Fig. 8 is a rear elevation of the machine illustrated in Fig. 6.
Figure 9:
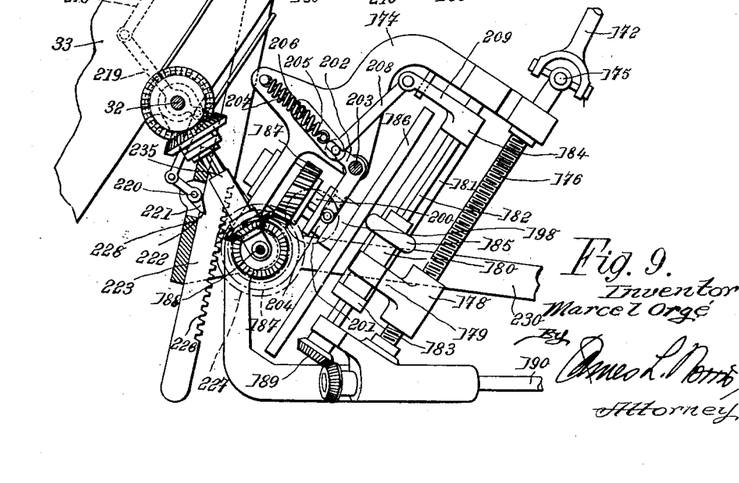
Fig. 9 is an enlarged view of a detail of construction in the form of machine represented in Figs. 6 to 8.

The intermediate conveying system above described may be dispensed with entirely, and the hay may, instead, be lifted directly by the elevating conveyor from the gathering rake as shown in the modifications illustrated in Figs. 3 to 9. Whether the elevating conveyor is connected to the intermediate conveying system or directly to the rake, its structure and function, with slight modifications, remain substantially the same. The conveyor comprises an endless belt 31 running over pulleys mounted on shafts 32 and $32^1$ which are journalled on a longitudinal frame connected to a carriage or support 33 extending above the upper extremity of the belt. The conveyor is pivotally mounted on its lower shaft 32 which is (1) supported between longérons 4 as shown in Figs. 1 and 2 and 6 to 9, or (2) as shown in Figs. 3 to 5, supported through the intermediary of members 116 and frame 100—101 and 102, said frame resting on axle 1 and being held in position by stops 92 attached to longérons 3. The position of belt 31 may be fixed at any desired inclination, or its inclination may be made adjustable with the height of the stack or bundle to be formed; by providing a pair of symmetrical notched arcs 34 on each side of carriage 33 and a fixed cross bar 35 engaging in any desired pair of notches. Belt 31 carries a series of staggered teeth 36 mounted on appropriate cross-strips. The forward end of the belt (teeth included), when operating in connection with belt 16 (Figs. 1 and 2) should occupy a position slightly rearward of the corresponding extremity of the latter and, when operating directly in connection with the rake, should be somewhat above the upper extremity of the rake teeth 7. The rear end of the belt should be in line, vertically, with platform 46 upon which the stacks are formed, and may serve as support, through the intermediary of arm 37 for guideplate 38.

Guiding means may be provided in connection with the elevating belt for directing the hay accumulating in those parts of the rake 7, not accessible to teeth 36, towards the latter. In Figs. 1 and 2, this guiding means comprises a pair of forks 70 facing the axis of the machine and mounted on wimbles 71 journalled on brackets attached to longérons 3. The forks oscillate transversally and carry the hay towards the belt. The guiding means shown in Figs. 3 to 9 comprises two endless belts 104 fitted with teeth 105, the belts moving slightly above, and transversally of, the rake teeth and towards belt 31. Belts 104 move on cylinders 106, 106¹ mounted in pairs on shafts 107, 107¹. Shaft 107 is loosely held in supports 108 and 116 mounted on frame 100—101—102. Shaft 107¹ is similarly mounted and is rotated by means of bevel 109, 110 driven from the wheel by means of a chain 111, clutch 112, intermediate shaft 113 and pinion 114. Since pinion 114 is keyed to shaft 32, it actuates the elevating belt as well. Carriage 33 is curved at its lower extremity so as to cover the above described mechanism and prevent hay entering thereinto. Teeth 105, penetrating through slots 115 are the only parts that emerge on the side of the belt actuating mechanism.

Means are provided, preferably, on the rear of the machine, for receiving hay elevated by belt 31. The hay receiving means is supported on a chassis formed by a pair of longitudinal bars 41 articulated on axle 1 and held together by transverse bar 42. The chassis carries a species of frame 44 pivotally mounted on transverse shaft 43, said frame being capable of being tilted relatively to the ground. Movement of frame 44 is limited by appropriate stops attached to the chassis and contacting under transverse bar 42. Frame 44 is limited posteriorly, by a pair of bars which come together at the median line of the machine to form an angle directed rearwardly. At their point of intersection these bars carry a supporting pivot 45 for a circular platform.

Two illustrative embodiments of the platform are shown in the drawings. In the form represented in Figs. 1 to 4, it is shown as forming in part a segment of a circle 46 somewhat larger than a semi-circle, having a top surface as smooth as possible and mounted on pivot 45 by means of a central recess, and in part by a grid complementing the segment of the circle. The ensemble of grid and segment 46 constituting the platform is capable of being rotated on its pivot 45 and is arranged to be stopped by a radial extension 48 when the ends of the bars point rearwardly. The stopping mechanism includes a movable abutment 49 formed as an arm on transverse shaft 50, which is journalled on cross-bar 43 of the chassis, and which carries a second arm 51 serving as a pedal operable from seat 52. Rotation of the platform is arrested by contact of extension 48 with stop 49 interposed in its path. The form of platform shown in Figs. 6 to 9 includes a circular rotatable plate and an intermittently operated conveyor, each operated automatically in a manner to be described later.

Means are provided for lowering the platform support until the platform contacts with the ground, and for then raising the latter to a substantially horizontal position. This means may be arranged either as shown in Figs. 1 and 2 or as shown in Figs. 3 to 5. In the form illustrated in Figs. 1 and 2, there is provided a transverse shaft 61, journalled on longérons 3, and rigidly connected to two arms 62 articulated with a pair of longitudinal levers 63 which are pivotally mounted at 264 on the external sides of longérons 3 at a point 64 above and substantially in vertical alignment with the axle 1. The rear extremities of levers 63 terminate at a point roughly in vertical alignment with the extremities of lateral arms 41 of chassis 44. The rear extremities of levers 63 are connected to the corresponding ends of arms 41 by chains 64. Shaft 61 is rigidly connected to a second pair of arms 65, lying substantially in the plane of carriage members 33, which arms are connected by a pair of the rods 66 to the extremities of supporting arms 37 carrying plate 38. A lever 67, similar to an ordinary automobile brake lever, is pivotally mounted at the extremity to the right of shaft 35 and is connected to an arm 68 mounted on shaft 61 by means of rod 69. From the foregoing, it is evident, that, by pushing lever 67 forward, the platform and its support are lowered. The lowering and raising mechanism shown in Figs. 3 to 5 comprises a central lever 67 mounted on transverse bar 35 near seat 52, a rod 117 connecting said lever 67 to an arm 118 mounted on a transverse shaft 53 journalled on the fixed chassis 3 slightly above and forwardly of rear cross-bar 6, a pair of arms 54 rigidly connected to shaft 53, a pair of rods 55, connecting arms 54 to one branch of bent levers 119 pivotally mounted at 112 on longérons 3, the other branch of said bent levers terminating in hooks 121, and chains 64 extending from levers 119 to the ends of rods 41 and having one shackle in engagement with hooks 121. Bars 41 form the sides of the platform support pivotally connected to the axle 1. Latch 58¹ of central lever 67, engaging in one of the notches of cam 58² which terminates in an inclined plane, holds the platform support in elevated position. On disengaging the latch from the notches, the platform support lowers itself by gravity, latch 58¹ sliding along the inclined plane of the cam. The platform support may be raised by means of lever 58, or better still by means of a pedal 122 (near seat 52) connected to a sleeve 123 carried by a transverse shaft 124 journalled on fixed chassis 3, said shaft having a toothed sector 125 keyed thereto, which sector meshes with a toothed sector 125¹ fixed on transverse shaft 53 above described. The position of platform 46 relatively to the ground may be adjusted by increasing or diminishing the length of chains 64.

Means are provided for supporting the rear end of chassis 3, when the machine is in operation (see Figs. 3 to 9) comprising a pair of auxiliary wheels 126 mounted on resilient supports 127, the wheels and their supports being rigidly connected to bars 128 which are pivotally mounted at 129 on longérons 3. The wheels may be swung on pivots 129 through an angle of 180° when the machine is on the road. A locking element 139 of any convenient design holds bars 128 against longérons 3 when the wheels are in operating position.

Means are provided for swinging the whole assembly of operating elements about axle 1 as an axis and for maintaining the assembly in elevated position when the machine is on the road (wheels 126 being in inverted position). This means may be of the form as shown either in Figs. 1 and 2, in Figs. 3 to 5, or as in Figs. 6 to 9. In the embodiment represented in Figs. 1 and 2, there is provided a transverse shaft 53 journalled on fixed chassis 3 somewhat forwardly and above the rearward cross-bar 6, arms 54 rigidly connected to shaft 53 and inclined forwardly, and bars 55 pivotally connected at one end to arms 54 and at their other end to shaft 24 carrying cylinder 23, said bars having extremities formed so as to be capable of engaging hooks 56 articulated with platform supporting arms 41. A central lever 58 connected to shaft 53, and preferably prolonged by a lever 58⁴, has its lower face in the form of an inclined plane 59 so that when the lever is lowered, said face 59 contacts with a small wheel 60 on the end of lever 11 and raises rake 7. From the foregoing, it is evident that, when lever 58⁴ is lowered sufficiently, movable frame or chassis 44 and all the elements supported thereon (hooks 56 being in engaged position) together with rake 7 are raised and the machine is ready to be taken onto the road. Lever 58⁴ is held in its extreme position by any appropriate stopping or holding device. In the form of elevating mechanism illustrated in Figs. 3 to 5, there is provided hooks 56 carried by bars 41, said hooks being engageable with lugs 56¹ mounted on element 100 of the frame supporting the motor mechanism, bolts passing through holes 130 formed in bars 100 and 90 forming the supporting frame of the rake, a lever 57¹ engaged in collars 131 and 132 in the manner of a bolt, said collars being carried respectively by transverse bar 102 and cross-bar 91. By manipulating lever 57¹, the ensemble may be made to pivot about axle 1 as a center and may be held in extreme position in any appropriate manner (not shown), it being understood that latch 98 of hand lever 57 is maintained in disengaged position with respect to the notches in cam 99, by means, for example, of a ring 98¹. The form of elevating mechanism represented in Figs. 6 to 9, comprises a crank or handle 236 mounted on chassis 3, which actuates a bar 102 carried on the free extremities of bars 41 articulated on axle 1, through the intermediary of a screw 237 having a forked extremity 238. When the machine is operating, bar 102 is sufficiently separated from the bottom of fork 238 to permit the inclining of the platform support toward the ground. To raise the platform support, crank 236 is turned until the fork pushes bar 102 downward, the frame supporting the rake being raised simultaneously (after disengagement of the latch of lever 57) by means of lugs or stops formed by the prolonged extremities of cross-bar 9 of said frame coming into contact with longitudinal bars 41.

Means are provided for forming the hay into bundles or stacks and for discharging the latter from the stacking platform by means of tilting mechanisms connected thereto, said tilting mechanisms being either of the type shown in Figs. 1 to 5 or 6 to 9. In the embodiment shown in Figs. 1 to 5, stacking and discharge are controlled by a workman seated at 52 who turns the platform on pivot 45 while the hay is falling from the elevating belt and, with the aid of a fork, gives the stack its proper form. When the grid portion of the platform faces rearwardly, the workman stops the rotation of the platform and actuates lever 67 (Figs. 1 and 2) or lever 58³ (Figs. 3 to 5) to tilt platform support 44 backward until grid 47 touches the ground. It requires only a slight push for the stack to slide the platform, the discharging operation being facilitated by the hay at the bottom of the stack passing between the grid bars and dragging along the ground. The platform may be then tilted back to horizontal position by means of lever 67 (Figs. 1 and 2) or pedal 122 (Figs. 3 and 4) and operations repeated. In the automatic stacking and discharging machine represented in Figs. 6 to 9, all the above described operations are carried out without the intervention of any workman or operator. The automatic stacking mechanism comprises the following structures:— a pair of guides of U section mounted on supports 133 located on each side of belt 31, said guides being formed by a pair of arms formed at right angles, arm 134 resting freely on shaft 32¹ and arm 135, of greater length, sloping downwardly in the direction of the contour of the stack to be formed; a supporting arm 140 connected to carriages 33 and serving to vary the slope of arm 135; a funnel or hopper 136 having upper and lower orifices; a chain 137 passing over grooved pulleys 138, and serving to slide funnel 136 along arms 135; a drum 141 mounted loosely on shaft 32¹ and connected to a ratchet wheel; a cable 142 wound on drum 141; a counterweight 143 serving to partially counterbalance the weight of funnel 136 and also to assure intermittent movement of the ratchet whenever the funnel approaches to close the upper part of arms 135, in which case a clutch automatically releases the detent or catch of the ratchet and permits the funnel to descend until the ratchet is again engaged by its detent pivoted supporting forks 144 located just under the funnel and moving against the action of springs 145; guiding forks 145¹ mounted on a rigid support under the funnel and serving to direct the hay toward the middle of platform 46; distributing forks comprising a series of lower teeth 147 located in the lower part of the forward wall of the funnel and a series of upper teeth 148 arranged in the lower part of the posterior funnel wall; means for oscillating teeth 147 and 148 backward and forward consisting of a pinion 149¹ keyed on shaft 32¹, a square shaft 149 actuated by said pinion, a bracket 150 supporting rod 149, said bracket being adjustable with respect to its axis of support 32¹, a sleeve 151, carried by funnel 136, having an orifice of circular section therein through which rod 149 slides, a pinion 152 with a square central bore slidably mounted on rod 149 and adapted to follow the movements of sleeve 151, a shaft 153 having a cranked portion 154 and supported by funnel 136, a sleeve 156 loosely mounted on shaft 153 and serving to support teeth 147, a gear 155 meshing with pinion 152 (above mentioned) and serving to continuously rotate shaft 153, an arm 157 connecting sleeve 156 to a crank shaft 158 driven from shaft 153 by chain 158¹, a shaft 159 cranked at 160 and mounted on funnel 136, a sleeve 161 fitting loosely on shaft 159 and supporting teeth 148, a pinion 162 driving shaft 159 and meshing with pinion 163, a shaft 164 driving pinion 163 and driven by a pinion 165 keyed to shaft 153, an arm connecting sleeve 161 to a crank 166 free to swing about a shaft 167 mounted on the support for shaft 159; and means for moving teeth 147 toward teeth 148 when the funnel is in elevated position i. e. when the top of the stack is to be formed, consisting of a pair of tubular supporting bars 168 serving to replace the fixed members on funnel 136 as supports for shaft 159 actuating teeth 148 and crank 166, tubular supports 169 maintained in fixed relation to funnel 136 and receiving bars 168 telescopically, a spring 170 positioned inside arm 168 and serving to separate the telescoping members, a square shaft 164 controlling the movement of teeth 148 and sliding through pinion 163 mounted on and driven by said shaft, and rods 171 serving as stops, and mounted on fixed guides 133, said rods serving to contact with the upper ends of arms 168 and to telescope members 168 and 169 progressively into one another as funnel 36 rises under the stacking action of forks 147 and 148.

The automatic mechanism for automatically varying the speed of rotation of platform 46 with the height of the stack being formed consists of a rod 172, a bevel gear 173 mounted on one end of said rod and driven by bevel gear 174 keyed to the shaft carrying drum 141 (rod 172, therefore, rotates at a speed which is a function of the angular displacements of drum 141 and, in consequence, of the position of funnel 136), a universal joint 175 mounted on the other extremity of rod 172, a threaded rod 176 driven from joint 175 and rotatably supported on frame 177 rigidly connected to platform support 41, an internally threaded cylinder 128 mounted on rod 176, an arm 179 integral with said cylinder, a sleeve 180 slidably mounted on a shaft 182 and actuated to move back and forth by arm 179, end abutments 183, 184 for sleeve 180 mounted on a cross-piece 181 which is capable of longitudinal movement under the action of said sleeve, a friction wheel 185 rigidly mounted on sleeve 180, a friction disc 186 driven by helicoidal gears 187 from shaft 188 which is in turn driven by the ensemble of drive wheel 71 keyed on axle 1, chain 111 and driven wheel 73, shaft 188 driving simultaneously shaft 32 actuating elevating belt 31 (friction plate 186 drives friction wheel 185 and, with it, shaft 182 at a speed varying with the distance of wheel 185 from the center of the friction disc; this distance varies with the position of threaded cylinder 178 on rod 176 and consequently with the position of funnel 136 relatively to platform 46), a bevel gear 189 keyed to shaft 182 and driving bevel gear 191 through the intermediary of rod 190, and a bevel gear 192 mounted on pivot 45 and driven by gear 191 (platform 46 rotates, therefore, with a speed which is a function of the position of funnel 136).

An automatic mechanism is provided for locking platform 46 in position when a stack has been completely formed and is ready to be discharged consisting of a latch 194 mounted to be swung on a support 195 so as to engage in notch 196 formed on the periphery of the platform, and a system of control rods 197 for moving latch 194 into a position where it drops into notch 196 when the latter moves under it and for releasing the latch from the notch quickly when operations recommence, said system of rods being controlled by friction plate 186 which is mounted so as to be moved axially by a clutch mechanism to be described below. The whole assembly is so arranged that when funnel 136 is at its highest position, friction plate 136 is out of contact with friction wheel 185 and platform 46, therefore stops rotating. Control rods 197 are actuated by control shaft 203 attached to the clutch mechanism connected to friction plate 186.

The mechanism for discharging the stack from the platform consists of an endless belt 193, supporting the stack, said belt being operated intermittently by a clutch operated mechanism controlling the axial movement of friction plate 186 in such a way that, when funnel 136 is at its highest position and friction wheel at the end of its course, the friction plate slides along shaft 200 out of contact with wheel 185 and into contact, on its opposite face, with friction wheel 201 which actuates endless belt 193 in a manner to be indicated further on. The mechanism controlling the clutches connected to friction wheel 186 consists of collar 198 mounted on shaft 200 and rigidly connected to plate 186, a bent lever 202 keyed to shaft 203 mounted on frame 177, said lever having one arm engaged in annular recess 204 of collar 198 and its other arm articulated with the extremity of a rod 205 mounted on pivot 206, said rod 205 being under the action of a spring 207 drawing the rod toward one or the other of its extreme positions corresponding to the extreme positions of collar 198, a connecting rod 208 connected at one extremity to bent lever 202, an arm 209 connected to the other end of rod 208, since arm 209 is integral with abutment 184 it will move under the action of the sleeve of friction wheel 185 until plate 186 moves out of contact with wheel 185 and into contact with friction wheel 201; rod 205 will be then displaced against the action of spring 207 until the points of attachment of the spring are in substantial alignment with pivot 206 and, in consequence, permit the spring to abruptly move plate 186 into contact with wheel 201 with a slight additional displacement of arm 209; the funnel, immediately afterward, disengages the catch controlling the ratchet connected to drum 141 and permits the automatic descent of said funnel while simultaneously bringing friction wheel 185 back to the center of friction plate 186, wheel 185 abutting against abutment 183 at the end of its return course, bringing the latter back to the position from which it was displaced by the prior movement of abutment 184 and displacing collar 198 so as to free friction wheel 201 from plate 186 and bring the latter into contact with friction wheel 185; shaft 203, meanwhile, follows the movement of collar 198 and actuates latch 194 so that the latter is in contact with the top face of platform 46 and ready to drop into notch 196, and a transmission interposed between friction wheel 201 and endless belt 193 and comprising shafts 210, 211, and a bevel gear 212 meshing with a bevel gear 213 which drives shaft 214, chain 215 and pulley 216 carrying the endless discharge belt.

The automatic mechanism controlling the tilting movement of chassis 41—44—102 consists of an arm 217 capable of being swung about shaft 32$^1$ as an axis by funnel 136 when the latter arrives at its highest position, a connecting rod 218 connected to said arm, a lever 219 actuated by rod 218 and pivoting about shaft 32 as an axis and a detent 221 mounted on shaft 220 and engaging in a notch 222 formed in member 223 rigidly connected to fixed chassis 3 (when detent 221 engages in notch 222, frame 41—44—102 is in elevated position and arm 217 in its lowered position). When arm 217 is raised, the detent is disengaged from it notch and frame 41—44—102 is lowered by gravity. The lowering movement may be rendered less violent by the use of springs, not shown, acting as shock-absorbers, a gear 227 loosely mounted on shaft 188 which is supported by supporting members 117 rigidly connected to chassis 41—44—102, a substantially vertical rack 226 meshing with pinion 227 and supported on member 223, a member 228 maintaining the rack and pinion in contact (pinion 227 is located so as to be at the bottom of the rack when the platform support is moved into inclined position for facilitating discharge of the stack by the endless belt), an arm 230 urged upward by a spring (not shown) and capable of angular displacement downwardly by funnel 136 when the latter reaches its lowest position i. e. when platform 46 is about to be moved back into horizontal position, and an automatic clutch mechanism interposed between pinion 227 and sprocket wheel 231 which is keyed to shaft 188, said mechanism being controlled by arm 230 in such manner that when the latter is lowered, a cam shaft 232 moves pinion 227 along shaft 188 until toothed members 233 and 234 mesh, thus causing pinion 227 to move along rack 226 until detent 221 enters notch 222, cam shaft 232 being so formed that, at the moment of engagement between detent 221 and notch 222, the tops of the corresponding projections on pinion 227 reach the bottom of the notches formed between the teeth of cam shaft 232, thus separating said pinion from member 234 and automatically uncoupling the clutch, it being understood that shaft 32 actuating belt 31, continues to be rotated by shaft 188, in spite of the inclination of the platform support due to the telescopic shaft shaft 235 interposed between shafts 32 and 188.

The mechanisms for transmitting power to the various devices hereinbefore described when the stacking machine is moving over a field consist of a primary transmission contacting a chain and sprocket drive 111—71—73 engaging with the rotating axle 1 through the intermediary of members 112. In the machine illustrated in Figs. 1 and 2, the primary transmission drives (1) main shaft 20, (2) shaft 32, through the intermediary of sprocket 75 (3) forks 70, through the intermediary of sprocket wheel 74, and (4) gear 80 and with shafts 17 and 24. When the machine (Figs. 1 and 2) moves forward the upper edge of belt 16 moves forwardly and the upper edge of belt 31 rearwardly but at a somewhat slower speed, drum 32 rotates counterclockwise and forks 70 oscillate back and forth.

In the form of machine represented in Figs. 3 and 4, the primary transmission drives main shaft 113 which in turn actuates the elevating belt 31 and lateral rakes 105.

The primary transmission connected to the automatic stacks shown in Figs. 6 to 9 drives main shaft 188 (which actuates elevating belt 31), lateral rakes 105, and friction plate 186 (which actuates platform 186 and discharge belt 193).

The machine represented in Figs. 1 and 2 is to be operated in the following manner. Assuming that the machine is to be taken onto a road, the operator actuates lever 58⁴ to raise chassis 44 (and the elements supported thereon), rake 7, and the rear end of belt 16 into elevated position. When the machine arrives on the field, lever 58⁴ is first operated to lower the above mentioned mechanisms, plate 38 being inclined so as not to interfere with the delivery of hay from belt 31 to platform 46, and is then moved forwardly so as to be out of the way; hooks 56 are then moved into release position as shown in the drawing and the machine is ready to function. As the machine is drawn across the field, rake 7 gathers the hay and delivers it to rotating drum 23 which in turn passes it to endless belt 16 where it is guided by forks 70 until deflected at 39 onto teeth 36 of elevating belt 31. The hay falling from belt 31 is formed into stacks of proper shape on platform 46 by a workman, who discharges the stack onto the ground by manipulating lever 67 to tilt said platform and giving the stack a slight push with his fork. During the interval that the stack is being discharged, plate 38 moves into position for intercepting and retaining hay falling from belt 31. After the stack is discharged, lever 67 is again manipulated to bring the platform back to horizontal position plate 38 again assumes an inclined position and drops the hay accumulated thereon onto the platform and the stacking operation recommences.

The machine shown in Figs. 3 to 5 is adjusted for movement over a road by lowering lever 57¹. The lowering of this lever elevates the platform support, the frame supporting the various operating mechanisms, and the frame supporting the rake. Once arrived on the field, wheels 126 are swung into operating position and locked by elements 130, lever 57¹ is manipulated to lower the various supporting frames above enumerated, carriages 33 supporting elevating belt 31 are given proper rearward inclination by adjusting arcs 34 on transverse bar 35, lever 37¹ is then detached entirely from the machine so as to be out of the zone of operations, the bolts are then removed from holes 130, hooks 56 are disengaged, and latch 98 of lever 57 is released from the notches in cam 99. The machine is then ready to operate. In operation, rakes 7 gather the hay while the lateral rakes and the elevating belt turn in the directions indicated. The hay falls from belt 31 onto platform 46. A workman turns the platform and gives the stack proper form by means of a fork. When the stack is formed, the operator actuates pedal 51, turns the platform until extension 48 abuts against stop 49, stops the elevating belt by manipulating a proper clutch and actuates lever 67 so as to release latch 58¹ from notch 58². Chassis 41 and the platform then tilt rearwardly and the stack is discharged automatically to the ground. As soon as the stack is discharged, pedal 122 is actuated to bring the platform back to horizontal position, the elevating belt is started again, and lever 67 brought back to its original position with latch 58¹ engaging in notch 58². The machine is then ready to form a new stack.

The automatic form of machine shown in Figs. 6 to 9 is adjusted into road position by tilting the ensemble of carriages 33 supporting elevating belt 31, funnel 136 and the operating mechanisms attached thereto, and support 177 about shaft 32 as an axis, and by then manipulating crank handle 236 so as to elevate the platform support and the rake frame. Once on the field, the machine is made ready for operation by swinging wheels 126 into operative position, moving carriages 33 backward, manipulating crank handle 236 to lower the platform and rake (detent 221 entering notch 222 and holding the platform support in proper position), and disengaging latch 98 of lever 59 from the notches in cam 99 so as to adjust the rake support at the most favorable inclination. The machine is thus ready to operate. In moving across the field, rakes 7, the lateral rakes and elevating belt 31 cooperate to deliver the hay to funnel or hopper 136, where distributing forks 147 and 148 form it into a stack. As the stack increases in height, the forks, and more especially teeth 147, supporting themselves on the heaped up hay, automatically raise funnel 136 along the guides serving to control the speed regulating mechanism 185—186. When the top of the stack is being formed fork 148 moves towards fork 147 so as to reduce the stack diameter. On reaching its highest position, funnel 136 actuates the clutch, controlling the rotation of platform 46, through the intermediary of rod 172 connected to sleeve 180 and abutment 184, so as to disengage said clutch mechanism (after latch 194 has stopped the platform) and simultaneously engage the mechanism for actuating discharge belt 193, at the same time freeing detent 221 from notch 222 (through the intermediary of arm 217) so as to permit the platform support to tilt, and disengaging the detent connected to the ratchet of drum 140 so as to lower the funnel automatically. When the funnel reaches the lower limit of its downward course, it actuates rod 172 on sleeve 180 and abutment 183, which control the clutch mechanism for rotating the platform, so as to engage said clutch mechanism and simultaneously disengage the mechanism for moving discharge by 193, latch 194 having first been disengaged from the platform. Funnel 136, through the intermediary of arm 230 and clutch 232—233, is also capable of elevating the platform support until detent 221 enters notch 222. The hay elevated during the interval of discharge of a stack accumulates in funnel 136 where it is held by retaining forks 144 until another stack is to be formed on the platform.

Gathering and stacking machines such as those hereinbefore described possess the following advantages over prior art devices (1), they stack the hay quickly when storms are threatening with a minimum use of hand labor (2) they are short in length (especially the machine shown in Figs. 1 and 2) and well balanced relatively to the axle, which makes their manœuvring in the field especially easy (3) they are relatively simple in construction (especially the form shown in Figs. 3 and 4) and require only a small amount of tractive power (4) they may be made to function completely automatically as shown in the modification represented in Figs. 6 to 9.

It is to be understood that the invention is not to be taken as limited to the particular constructions herein described. The modification shown in Figs. 6 to 9 may, for example, be fitted with the intermediate belt conveyor system shown in Figs. 1 and 2 and conversely, the modifications shown in either Figs. 1 and 2, or 3 and 4 may be fitted with the automatic stacking and discharge features described in connection with the form of machine illustrated in Figs. 6 to 9. The lateral rakes or forks shown in Figs. 3 to 9 may be combined with the principal rake so that the latter has a width substantially equal to that of elevating belt 31, the lateral rakes, operating, preferably, at the same level as the main rake, thus constituting a horizontal feed mechanism guiding the hay directly and continuously toward the endless belt.

What I claim is:—

1. An agricultural machine comprising in combination a rake, an elevating conveyor arranged to pick up hay from the central portion of the rack, auxiliary conveyors positioned to deliver hay from the ends of the rake to the center, a platform positioned to receive hay from the elevating conveyor, means for tilting said platform, and means for rotating said platform.

2. An agricultural machine comprising in combination a rake, an elevating belt conveyor, a platform arranged to receive hay from said conveyor, and an endless belt arranged to run parallel to the top surface of said platform.

3. An agricultural machine comprising in combination a rake, an elevating belt conveyor, a platform arranged to receive hay from said conveyor, a belt conveyor running over the top and under the bottom of said platform, and means for intermittently operating said last named conveyor.

4. An agricultural machine comprising in combination a rake, an elevating conveyor belt, a platform arranged to receive hay from said conveyor belt, a belt conveyor arranged in connection with the top of the platform, and means for rotating the platform.

5. An agricultural machine comprising in combination a rake, an elevating conveyor belt, a platform arranged to receive hay from said conveyor belt, a discharging belt conveyor arranged in connection with the top of said platform, means for rotating the platform, means for tilting the platform and means for intermittently operating the discharging belt conveyor.

6. An agricultural machine comprising in combination an axle, a pair of wheels mounted thereon, a rake, a conveyor arranged to pick up hay from the central portion of the rake, endless conveyors delivering hay from the ends of the hay toward the center thereof, and means for transmitting power from the wheels to the conveyors.

7. An agricultural machine comprising in combination an axle, a pair of wheels mounted thereon, a rake, a conveyor arranged to pick up hay from the central portion of the rake, endless conveyors delivering hay from the ends of the rake towards the center thereof, a platform support pivotally mounted on the axle, a platform rotatably mounted on said platform support, means for transmitting power from the wheels to the conveyors, means for lowering and raising the rake, and means for swinging the platform support about the axle as a center.

8. An agricultural machine comprising in combination a rake, a platform, a conveyor arranged to deliver hay from the rake to the conveyor, an intermittently operable discharge belt fitted to the top surface of the platform, means for rotating the platform, means for forming a stack thereon, and means for actuating the discharge belt when the stack has being formed.

9. An agricultural machine comprising in combination a rake, a rotatable platform, a conveyor arranged to deliver hay from the rake to the conveyor, a discharge belt fitted to the top of the platform, and means operating automatically to successively rotate the platform, form a stack thereon, arrest the rotation of the platform, and actuate the discharge belt.

10. In an agricultural machine, a stack forming device comprising a rotatable platform and means for rotating the platform at speeds varying with the height of the stack being formed.

11. In an agricultural machine, a stack forming device comprising a platform, means for rotating the platform at speeds varying with the height of the stack being formed, and means for discharging the formed stack from the platform.

12. In an agricultural machine, a stack forming device comprising a platform, and means operating automatically to successively, (1) rotate the platform at speeds varying with the height of the stack being formed, (2) arrest the rotation of the platform and, (3) discharge the formed stack to the ground.

13. An agricultural machine comprising in combination a rake, a platform, a conveyor arranged to deliver hay from the rake to the platform, and means for rotating the platform at speeds varying with the height of the stack being formed.

14. An agricultural machine comprising in combination a rake, a tiltable, rotatable platform, a conveyor arranged to deliver hay from the rake to the conveyor, and means operating automatically to successively rotate the platform at speeds varying with the height of the stack being formed, form the stack, arrest the rotation of the platform when the stack is completely formed, tilt the platform, and discharge the stack therefrom.

15. In an agricultural machine a stack-forming device comprising in combination a rotatable platform, a funnel feeding hay to the platform, pivotally mounted stack-forming forks, means for rotating the platform and means for oscillating the forks.

16. An agricultural machine comprising in combination a rake, a platform, a conveyor arranged to carry hay from the rake to the platform, a guiding funnel interposed between the conveyor and the platform, means for rotating the platform, means for retaining hay in the guiding funnel when the platform stops rotating, means for guiding the hay from the funnel toward the center of the platform, and means for distributing the hay on the platform so as to give the stack proper form.

17. In an agricultural machine a stacking device comprising, a rotatable platform, a pair of stack-forming forks, and means for rotating the platform at speeds varying with the height of the stack being formed.

18. In an agricultural machine a stacking device comprising in combination a rotatable platform, a pair of stack-forming forks, and means for varying the distance between the forks with the height of the stack being formed.

18. In an agricultural machine a stacking device comprising in combination a rotatable platform, a pair of stack-forming forks, means for rotating the platform at speeds varying with the height of the stack being formed, and means for varying the distance between the forks with said height.

20. In an agricultural machine, a stacking device comprising in combination a rotatable platform, a pair of stack-forming forks, a guiding funnel for directing hay onto the platform, means for rotating the platform, means for moving the forks relatively to one another, and means controlled by the height of the funnel for varying the speed of rotation of the platform and the distance between the forks.

21. In an agricultural machine, a stacking device comprising in combination a rotatable platform, a funnel adapted to feed hay to the platform, said funnel being displaceable vertically, means for rotating the platform, and means controlled by the position of the funnel for varying the speed of rotation of the platform.

22. In an agricultural machine, a stacking device comprising a vertically displaceable funnel, a rotatable platform, a retaining fork connected to the bottom of the funnel and functioning whenever the platform stops rotating, a directing fork guiding the hay toward the center of the platform, a pair of distributing forks, means for rotating the platform, means for varying the distance between the distributing forks, and means controlled by the vertical position of the funnel for varying the speed of rotation of the platform and the distance between the distributing forks.

23. An agricultural machine comprising in combination a rake, a conveyor, a partially counterweighted, vertically displaceable funnel suspended from said conveyor, a platform, means for rotating said platform, mean for stopping the rotation of the platform when the funnel reaches the upper limit of its vertical movement, means for forming a stack on the platform, and means for discharging the formed stack therefrom when the rotation of the platform is stopped.

24. An agricultural machine comprising in combination a rake, a conveyor, a partially counterweighted, vertically displaceable funnel, a platform, and means operating automatically, to successively stack the rotation of the platform when the funnel is in its lowermost position, to vary the speed of rotation of said platform with the height of said funnel and to stop said platform at the upper limit of the funnel's movement.

25. An agricultural machine comprising in combination a rake, an elevating conveyor, a vertically displaceable funnel, a platform, stack forming means arranged in connection with the platform, means for rotating the platform, means for tilting said platform, a discharging conveyor connected to the platform, and means functioning automatically to successively rotate the platform at speeds varying with the height of the funnel while simultaneously activating the stack-forming means, stop the rotation of the platform when the funnel reaches its highest position, tilt the platform, actuate the discharging conveyor, stop the discharging conveyor while permitting the funnel to move to its lowest position, tilt the platform back to normal position, and restart the rotation of said platform.

26. An agricultural machine comprising in combination an axle, a pair of wheels, a fixed chassis mounted on said wheels, an auxiliary wheel pivotably mounted on said fixed chassis, a movable chassis pivotally mounted on the axle, a rake, an elevating conveyor, belt conveyors arranged to carry hay from the sides of the rake toward its center, means for raising and lowering the rake, a platform pivotally and tiltably mounted on the movable chassis, a vertically displaceable funnel interposed between the elevating conveyor and the platform, stack-forming means operating over the platform, a discharge belt operating in connection with the platform, means for rotating, tilting and stopping said platform, means operating automatically to successively rotate the platform at speeds varying with the vertical position of the funnel while simultaneously actuating the stack forming means, stop the rotation of the platform when the funnel reaches its highest position, tilt the platform, actuate the discharging conveyor, stop said last named conveyor while permitting the funnel to drop to its lowest position, tilt the platform back to normal position and restart the rotation of said platform, and means for swinging the movable chassis about the axle as an axis.

In testimony whereof I have hereunto set my hand.

MARCEL ORGE.